US008616953B2

(12) United States Patent
Yi

(10) Patent No.: US 8,616,953 B2
(45) Date of Patent: Dec. 31, 2013

(54) REEL SYMBOL RESIZING FOR REEL BASED GAMING MACHINES

(75) Inventor: Jae Man Yi, Reno, NV (US)

(73) Assignee: IGT, Reno, NV (US)

( * ) Notice: Subject to any disclaimer, the term of this patent is extended or adjusted under 35 U.S.C. 154(b) by 1638 days.

(21) Appl. No.: 11/849,119

(22) Filed: Aug. 31, 2007

(65) Prior Publication Data

US 2009/0061984 A1 Mar. 5, 2009

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................................. 463/20; 463/16; 463/31

(58) Field of Classification Search

USPC ........................ 463/16–20, 25, 29–31, 40–42

See application file for complete search history.

(56) References Cited

U.S. PATENT DOCUMENTS

| | | | |
|---|---|---|---|
| 3,708,219 | A | 1/1973 | Forlini et al. |
| 4,333,715 | A | 6/1982 | Brooks |
| 4,517,558 | A | 5/1985 | Davids |
| 4,607,844 | A | 8/1986 | Fullerton |
| 4,621,814 | A | 11/1986 | Stepan et al. |
| 4,659,182 | A | 4/1987 | Aizawa |
| 4,718,672 | A | 1/1988 | Okada |
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,319,491 | A | 6/1994 | Selbrede |
| 5,342,047 | A | 8/1994 | Heidel et al. |
| 5,364,100 | A | 11/1994 | Ludlow et al. |
| 5,375,830 | A | 12/1994 | Takemoto et al. |
| 5,376,587 | A | 12/1994 | Buchmann et al. |

(Continued)

FOREIGN PATENT DOCUMENTS

| | | |
|---|---|---|
| EP | 0 454 423 | 10/1991 |
| EP | 0 484 103 | 5/1992 |

(Continued)

OTHER PUBLICATIONS

"SPD," Malvino Inc., www.malvino.com, Jul. 19, 1999, 10 pages.

(Continued)

*Primary Examiner* — Milap Shah

(74) *Attorney, Agent, or Firm* — Foley & Lardner LLP

(57) ABSTRACT

Gaming machines, systems and methods for sizing or resizing visible reel symbols are disclosed. Gaming machines include an exterior housing, master gaming controller, display device and mechanical or virtual reels. Reels include a plurality of reel stops, each containing a visible reel symbols or a blank or ghost region. Visible reel symbols are expanded into adjacent reel stops, which can be ghosts or blank reel stops, such that blank areas are reduced. A reel configurator sizes or resizes the visible reel symbols, which reel configurator can be located at a remote host or within the gaming machine itself. A remote host can provide downloadable virtual reel strips and visible reel symbols to gaming machines within a system including processor-based machines. Resizing of visible reel symbols can involve stretching the symbols in a direction that extends into one or both reel stops adjacent to the reel stop containing the stretched reel symbol.

25 Claims, 8 Drawing Sheets

(56) References Cited

U.S. PATENT DOCUMENTS

| | | | |
|---|---|---|---|
| 5,393,061 | A | 2/1995 | Manship et al. |
| 5,467,893 | A | 11/1995 | Landis, II et al. |
| 5,539,547 | A | 7/1996 | Ishii et al. |
| 5,580,055 | A | 12/1996 | Hagiwara |
| 5,585,821 | A | 12/1996 | Ishikura et al. |
| 5,589,980 | A | 12/1996 | Bass et al. |
| 5,745,197 | A | 4/1998 | Leung et al. |
| 5,752,881 | A | 5/1998 | Inoue |
| 5,764,317 | A | 6/1998 | Sadovnik et al. |
| 5,910,046 | A | 6/1999 | Wada et al. |
| 5,951,397 | A | 9/1999 | Dickinson |
| 5,956,180 | A | 9/1999 | Bass et al. |
| 5,967,893 | A | 10/1999 | Lawrence et al. |
| 6,001,016 | A | 12/1999 | Walker et al. |
| 6,015,346 | A | 1/2000 | Bennett |
| 6,027,115 | A | 2/2000 | Griswold et al. |
| 6,050,895 | A | 4/2000 | Luciano et al. |
| 6,054,969 | A | 4/2000 | Haisma |
| 6,059,658 | A | 5/2000 | Mangano et al. |
| 6,135,884 | A | 10/2000 | Hedrick et al. |
| 6,159,098 | A | 12/2000 | Slomiany et al. |
| 6,213,875 | B1 | 4/2001 | Suzuki |
| 6,244,596 | B1 | 6/2001 | Kondratjuk |
| 6,251,014 | B1 | 6/2001 | Stockdale et al. |
| 6,252,707 | B1 | 6/2001 | Kleinberger et al. |
| 6,254,481 | B1 | 7/2001 | Jaffe |
| 6,315,666 | B1 | 11/2001 | Mastera et al. |
| 6,337,513 | B1 | 1/2002 | Clevenger et al. |
| 6,347,996 | B1 | 2/2002 | Gilmore et al. |
| 6,368,216 | B1 | 4/2002 | Hedrick et al. |
| 6,379,244 | B1 | 4/2002 | Sagawa et al. |
| 6,398,220 | B1 | 6/2002 | Inoue |
| 6,416,827 | B1 | 7/2002 | Chakrapani et al. |
| 6,444,496 | B1 | 9/2002 | Edwards et al. |
| 6,445,185 | B1 | 9/2002 | Damadian et al. |
| 6,491,583 | B1 | 12/2002 | Gauselmann |
| 6,503,147 | B1 | 1/2003 | Stockdale et al. |
| 6,511,375 | B1 | 1/2003 | Kaminkow |
| 6,512,559 | B1 | 1/2003 | Hashimoto et al. |
| 6,514,141 | B1 | 2/2003 | Kaminkow et al. |
| 6,517,433 | B2 | 2/2003 | Loose et al. |
| 6,517,437 | B1 | 2/2003 | Wells et al. |
| 6,547,664 | B2 | 4/2003 | Saunders |
| 6,575,541 | B1 | 6/2003 | Hedrick et al. |
| 6,585,591 | B1 | 7/2003 | Baerlocher et al. |
| D480,961 | S | 10/2003 | Deadman |
| 6,646,695 | B1 | 11/2003 | Gauselmann |
| 6,652,378 | B2 | 11/2003 | Cannon et al. |
| 6,659,864 | B2 | 12/2003 | McGahn et al. |
| 6,661,425 | B1 | 12/2003 | Hiroaki |
| 6,695,703 | B1 | 2/2004 | McGahn |
| 6,702,675 | B2 | 3/2004 | Poole et al. |
| 6,712,694 | B1 | 3/2004 | Nordman |
| 6,715,756 | B2 | 4/2004 | Inoue |
| 6,717,728 | B2 | 4/2004 | Putilin |
| 6,722,979 | B2 | 4/2004 | Gilmore et al. |
| 6,802,777 | B2 | 10/2004 | Seelig et al. |
| 6,817,945 | B2 | 11/2004 | Seelig et al. |
| 6,817,946 | B2 | 11/2004 | Motegi et al. |
| 6,887,157 | B2 | 5/2005 | LeMay et al. |
| 6,890,259 | B2 | 5/2005 | Breckner et al. |
| 6,906,762 | B1 | 6/2005 | Witehira et al. |
| 6,937,298 | B2 | 8/2005 | Okada |
| 7,095,180 | B2 | 8/2006 | Emslie et al. |
| 7,097,560 | B2 | 8/2006 | Okada |
| 7,128,647 | B2 | 10/2006 | Muir |
| 7,159,865 | B2 | 1/2007 | Okada |
| 7,160,187 | B2 | 1/2007 | Loose et al. |
| 7,204,753 | B2 | 4/2007 | Ozaki et al. |
| 7,207,883 | B2 | 4/2007 | Nozaki et al. |
| 7,220,181 | B2 | 5/2007 | Okada |
| 7,252,288 | B2 | 8/2007 | Seelig et al. |
| 7,255,643 | B2 | 8/2007 | Ozaki et al. |
| 7,309,284 | B2 | 12/2007 | Griswold et al. |
| 7,322,884 | B2 | 1/2008 | Emori et al. |
| 7,329,181 | B2 | 2/2008 | Hoshino et al. |
| 2001/0013681 | A1 | 8/2001 | Bruzzese et al. |
| 2002/0045472 | A1 | 4/2002 | Adams |
| 2002/0173354 | A1 | 11/2002 | Winans et al. |
| 2003/0027624 | A1 | 2/2003 | Gilmore et al. |
| 2003/0032478 | A1 | 2/2003 | Takahama et al. |
| 2003/0032479 | A1 | 2/2003 | LeMay et al. |
| 2003/0087690 | A1 | 5/2003 | Loose et al. |
| 2003/0130028 | A1 | 7/2003 | Aida et al. |
| 2003/0176214 | A1 | 9/2003 | Burak et al. |
| 2003/0203753 | A1* | 10/2003 | Muir et al. ...................... 463/20 |
| 2003/0236114 | A1 | 12/2003 | Griswold et al. |
| 2004/0023714 | A1 | 2/2004 | Asdale |
| 2004/0029636 | A1 | 2/2004 | Wells |
| 2004/0036218 | A1* | 2/2004 | Inoue ............................ 273/292 |
| 2004/0063490 | A1 | 4/2004 | Okada |
| 2004/0066475 | A1 | 4/2004 | Searle |
| 2004/0116178 | A1 | 6/2004 | Okada |
| 2004/0147303 | A1 | 7/2004 | Imura et al. |
| 2004/0150162 | A1 | 8/2004 | Okada |
| 2004/0162146 | A1 | 8/2004 | Ooto |
| 2004/0166925 | A1 | 8/2004 | Emori et al. |
| 2004/0171423 | A1 | 9/2004 | Silva et al. |
| 2004/0183972 | A1 | 9/2004 | Bell |
| 2004/0192430 | A1 | 9/2004 | Burak et al. |
| 2004/0198485 | A1 | 10/2004 | Loose et al. |
| 2004/0207154 | A1 | 10/2004 | Okada |
| 2004/0209666 | A1 | 10/2004 | Tashiro |
| 2004/0209667 | A1 | 10/2004 | Emori et al. |
| 2004/0209668 | A1 | 10/2004 | Okada |
| 2004/0209671 | A1 | 10/2004 | Okada |
| 2004/0209678 | A1 | 10/2004 | Okada |
| 2004/0209683 | A1 | 10/2004 | Okada |
| 2004/0214635 | A1 | 10/2004 | Okada |
| 2004/0214637 | A1 | 10/2004 | Nonaka |
| 2004/0224747 | A1 | 11/2004 | Okada |
| 2004/0233663 | A1 | 11/2004 | Emslie et al. |
| 2004/0235558 | A1* | 11/2004 | Beaulieu et al. ................ 463/20 |
| 2004/0239582 | A1 | 12/2004 | Seymour |
| 2005/0032571 | A1 | 2/2005 | Asonuma |
| 2005/0037843 | A1 | 2/2005 | Wells et al. |
| 2005/0049032 | A1 | 3/2005 | Kobayashi |
| 2005/0049046 | A1 | 3/2005 | Kobayashi |
| 2005/0062410 | A1 | 3/2005 | Bell et al. |
| 2005/0063055 | A1 | 3/2005 | Engel |
| 2005/0079913 | A1 | 4/2005 | Inamura |
| 2005/0085292 | A1 | 4/2005 | Inamura |
| 2005/0153772 | A1 | 7/2005 | Griswold et al. |
| 2005/0153775 | A1 | 7/2005 | Griswold et al. |
| 2005/0192090 | A1 | 9/2005 | Muir et al. |
| 2005/0206582 | A1 | 9/2005 | Bell et al. |
| 2005/0208994 | A1 | 9/2005 | Berman |
| 2005/0233799 | A1 | 10/2005 | LeMay et al. |
| 2005/0239539 | A1 | 10/2005 | Inamura |
| 2005/0266912 | A1 | 12/2005 | Sekiguchi |
| 2005/0285337 | A1 | 12/2005 | Durham et al. |
| 2006/0100014 | A1 | 5/2006 | Griswold et al. |
| 2006/0103951 | A1 | 5/2006 | Bell et al. |
| 2006/0125745 | A1 | 6/2006 | Evanicky |
| 2006/0166727 | A1 | 7/2006 | Burak |
| 2006/0191177 | A1 | 8/2006 | Engel |
| 2006/0284574 | A1 | 12/2006 | Emslie et al. |
| 2006/0290594 | A1 | 12/2006 | Engel et al. |
| 2007/0004510 | A1 | 1/2007 | Underdahl et al. |
| 2007/0004513 | A1 | 1/2007 | Wells et al. |
| 2007/0010315 | A1 | 1/2007 | Hein |
| 2007/0060261 | A1* | 3/2007 | Gomez ........................... 463/16 |
| 2007/0066389 | A1* | 3/2007 | Kojima ........................... 463/31 |
| 2007/0293300 | A1* | 12/2007 | Kojima ........................... 463/20 |
| 2008/0020816 | A1 | 1/2008 | Griswold et al. |
| 2008/0020839 | A1 | 1/2008 | Wells et al. |
| 2008/0020840 | A1 | 1/2008 | Wells et al. |
| 2008/0020841 | A1 | 1/2008 | Wells et al. |
| 2008/0108411 | A1* | 5/2008 | Jensen et al. .................... 463/20 |
| 2008/0188286 | A1* | 8/2008 | Jaffe ............................... 463/20 |

(56) References Cited

U.S. PATENT DOCUMENTS

FOREIGN PATENT DOCUMENTS

| | | | |
|---|---|---|---|
| EP | 0 997 857 | | 10/1999 |
| EP | 1 260 928 | | 11/2002 |
| EP | 1 282 088 | | 2/2003 |
| EP | 1 462 152 | A2 | 9/2004 |
| GB | 1 464 896 | | 2/1977 |
| JP | 04-220276 | | 8/1992 |
| JP | 06-043425 | | 2/1994 |
| JP | 07-124290 | | 5/1995 |
| JP | 2000-300729 | | 10/2000 |
| JP | 2000-350805 | | 12/2000 |
| JP | 2001-062032 | | 3/2001 |
| JP | 2001-238995 | | 9/2001 |
| JP | 2001-252393 | | 9/2001 |
| JP | 2001-252394 | | 9/2001 |
| JP | 2002-085624 | | 3/2002 |
| JP | 2004-089707 | | 3/2004 |
| JP | 2004073627 | A * | 3/2004 |
| JP | 2004-105616 | | 4/2004 |
| JP | 2004-166879 | | 6/2004 |
| JP | 2005-253561 | | 9/2005 |
| JP | 2005-266387 | | 9/2005 |
| JP | 2005-266388 | | 9/2005 |
| JP | 2005-274906 | | 10/2005 |
| JP | 2005-274907 | | 10/2005 |
| JP | 2005-283864 | | 10/2005 |
| JP | 2006-346226 | | 12/2006 |
| WO | 99/42889 | | 8/1999 |
| WO | 99/44095 | | 9/1999 |
| WO | 01/15127 | | 3/2001 |
| WO | 01/15128 | | 3/2001 |
| WO | 01/15132 | | 3/2001 |
| WO | 01/09664 | | 8/2001 |
| WO | 03/039699 | | 5/2003 |
| WO | 2004/001486 | | 12/2003 |
| WO | 2004/102520 | | 11/2004 |
| WO | 2006/034192 | | 3/2006 |
| WO | 2006/038819 | | 4/2006 |

OTHER PUBLICATIONS

Bosner, “How Smart Windows Work,” HowStuffWorks, Inc.,www.howstuffworks.com, 1998-2004, 9 pages.

Exam Report dated Sep. 21, 2007 from European Application No. 05 705 315.9.

Novel 3-D Video Display Technology Developed, News release: Aug. 30, 1996, www.eurekalert.org/summaries/1199.html, printed from Internet Archive using date Sep. 2, 2000.

Saxe et al., “Suspended-Particle Devices,”, www.refr-spd.com, Apr./May. 1996, 5 pages.

Time Multiplexed Optical Shutter (TMOS): A revolutionary Flat Screen Display Technology, www.vea.com/TMOS.html, Apr. 8, 1999, printed from Internet Archive using date Oct. 6, 1999.

Time Multiplexed Optical Shutter (TMOS): A revolutionary Flat Screen Display Technology, www.tralas.com/TMOS.html, Apr. 5, 2001, printed from Internet Archive using date Apr. 11, 2001.

U.S. Appl. No. 11/938,086, filed Nov. 9, 2007.

U.S. Appl. No. 11/877,611, filed Oct. 23, 2007.

Office Action dated Aug. 29, 2007 from U.S. Appl. No. 10/755,598.

Office Action dated Oct. 31, 2007 from U.S. Appl. No. 10/213,626.

Final Office Action dated Mar. 28, 2007 from U.S. Appl. No. 10/213,626.

Office Action dated Apr. 27, 2006 from U.S. Appl. No. 10/213,626.

Final Office Action dated Jan. 10, 2006 from U.S. Appl. No. 10/213,626.

Office Action dated Aug. 31, 2004 from U.S. Appl. No. 10/213,626.

“Light Valve”. [online] [retrieved on Nov. 15, 2005]. Retrieved from the Internet URL http://www.meko.co.uk/lightvalve.shtml (1 page).

“Liquid Crystal Display”. [online]. [retrieved on Nov. 16, 2005]. Retrieved form the Internet URL http://en.wikipedia.org/wiki/LCD (6 pages).

Bonsor, Kevin, “How Smart Windows Will Work,” Howstuffworks, Inc. 1998-2002, http://www/howstuffworks.com/smart-window.htm/printable. Printed Nov. 25, 2002 (5 pages).

“What is SPD?” SPD Systems, Inc. 2002, http://www.spd-systems.com/spdq.htm. Printed Dec. 4, 2002 (2 pages).

“Debut of the Let’s Make a Deal Slot Machine,” Let’s Make a Deal 1999-2002, http:///www.letsmakeadeal.com/pr01.htm. Printed Dec. 3, 2002 (2 pages).

U.S. Appl. No. 11/858,695, filed Sep. 20, 2007.

U.S. Appl. No. 11/858,845, filed Sep. 20, 2007.

U.S. Appl. No. 11/858,849, filed Sep. 20, 2007.

U.S. Appl. No. 11/859,127, filed Sep. 21, 2007.

U.S. Appl. No. 11/938,184, filed Nov. 9, 2007.

U.S. Appl. No. 11/938,151, filed Nov. 9, 2007.

* cited by examiner

REEL SYMBOL RESIZING FOR REEL BASED GAMING MACHINES

TECHNICAL FIELD

The present invention relates generally to wager based gaming machines, and more specifically to the configuration and design of reels for reel-type slots or gaming machines.

BACKGROUND

Casinos and other similar venues make up a growing multi-billion dollar gaming industry. As technology in the gaming industry progresses, traditional mechanically driven reel slot machines are steadily being replaced by electronic machines having an LCD video display or the like. Processor-based gaming machines are becoming the norm. One reason for their increased popularity is the nearly endless variety of games that can be implemented using processor-based technology. The processor-based gaming machines permit the operation of more complex games, advance player tracking, improve security, permit wireless communications, and add a host of digital features that are not possible on mechanical-driven gaming machines. The increasing cost of designing, manufacturing, and maintaining complex mechanical gaming machines has also motivated casinos and the gaming industry to abandon these older machines.

A "mechanical reel" machine generally refers to a slot machine having traditional hardware rotating reels with their associated latches and mechanical parts. A mechanical reel usually has a fixed number of reel symbols disposed about a reel strip attached about the circumference of a wheel. A motor, spring, or other mechanical system physically spins the wheel until it stops at a particular rotational position or "reel stop" and a particular symbol rests in view of a player to indicate an outcome for that reel for a given reel game. In many older machines, the reels and symbols were spun by potential energy, first stored in a spring-loaded mechanism wound and then actuated by the pull of a traditional pull-arm handle. Each reel was stopped at a random position by a mechanical device. The slot machine sensed an outcome, usually along a central payline, by sensing the physical position of each reel. As noted, such traditionally mechanically driven reel slot machines are being replaced by electronic gaming machines that are adapted to simulate such reel based games on a video display.

In a typical gaming machine, such as a video simulated multi-reel slot machine, a game play is first initiated through a player wager of money or credit, whereupon the gaming machine determines a game outcome, presents the game outcome to the player and then potentially dispenses an award of some type, including a monetary award, depending upon the game outcome. Electronic and microprocessor based gaming machines can include a variety of hardware and software components to provide a wide variety of game types and game playing capabilities, with such hardware and software components being generally well known in the art. A typical electronic gaming machine can include hardware devices and peripheral such as bill validators, coin acceptors, card readers, keypads, buttons, levers, touch screens, coin hoppers, player tracking units and the like. In addition, each gaming machine can have various audio and visual display components that can include, for example, speakers, display panels, belly and top glasses, exterior cabinet artwork, lights, and top box dioramas, as well as any number of video displays of various types to show game play and other assorted information.

Whether a reel-type slot machine uses actual mechanical reels or a video based reel simulation, each reel within a plurality of reels or simulated reels typically includes a number of reel stops, at least some of which contain reel symbols. Such reel symbols can include various fruits, bells, bars, gems and/or numbers (such as a "lucky 7"), as well as a wide variety of other symbols, shapes or designs. A typical mechanical gaming machine might have, for example, 17 reel stops per reel, although this number can vary. Such a reel would then tend to have 17 equally sized sections within which reel symbols might be placed. In some gaming machines, however, not every reel stop has a visible and distinctive reel symbol. Rather, such machines have "blanks" or "ghosts" at various reel stops, which blanks or ghosts consist only of empty space. That is, if an exemplary traditional mechanical wheel has 17 reel stops, 10 of these reel stops might have visible reel symbols, while 7 of them might simply have blanks or no visible reel symbol. Such a blank reel stop feature is well known in the field of slot machines, and this feature has been carried over into various video based reel simulations on some processor based slot machines.

While blank reel stops are well known in the industry, such items are typically unpopular with players, due at least in some part to the tendency of most games utilizing such blanks to have little to no prize payouts for a reel combination that involves a blank reel stop. As such, the use or even appearance of too many of such blank reel stops or "ghosts" on a gaming machine can tend to discourage the play of some machines by some players. Even where a gaming machine is no more likely to award a prize or increase the amount of a prize, the perception for some players can be improved where the mechanical or simulated reels of the machine contain lots visible reel symbols. As such, gaming reels that have fewer or limited blank areas tend to be more visually appealing to many players.

In addition, there are many instances where a gaming machine operator or manufacturer might want to emphasize one or more reel symbols or entire types or categories of reel symbols. Efforts to emphasize individual reel symbols to date have included the use of specialized backlighting, payline graphical overlays and various highlighting techniques, as well as various other attention drawing features.

While existing designs and systems for providing and displaying reel stops and reel symbols on slot machines, and particularly reel stops and symbols that include blanks or ghosts, have been adequate in the past, improvements are usually welcomed and encouraged. In light of the foregoing, it is thus desirable to develop improved gaming reels that are even more visually appealing to many players.

SUMMARY

It is an advantage of the present invention to provide improved gaming reels for reel-type, wager-based gaming machines that contain fewer blank spaces and areas, such that these gaming reels are more appealing to players. This can be accomplished at least in part through the use of gaming reels having visible reel symbols that have been expanded into any blank reel stops that might exist on the gaming reel. It is an additional advantage of the present invention to provide a reel configurator that is adapted to stretch or otherwise resize visible reel symbols such that the visible reel symbols expand into the blank areas of blank or ghost reel stops.

In many embodiments, this involves configuring virtual reels and/or reel symbols for an electronic or processor-based gaming machine that simulates the play of traditional mechanical reel-based machines. In other embodiments, this involves configuring actual mechanical reels for use in a mechanical or electromechanical gaming machine. In either type of embodiment, the presentation of visible reel symbols is made such that at least a portion of these visible reel symbols are expanded into the blank areas of reel stops that are blanks or ghosts.

In various embodiments of the present invention, a processor-based gaming machine adapted for accepting a wager, playing a game based on the wager and granting a payout based on the result of the game is provided. Such a gaming machine can include an exterior housing arranged to contain various internal gaming machine components therein, a master gaming controller in communication with various internal gaming machine components and adapted to execute or control one or more aspects of the wager based game, a display device in communication with the master gaming controller and adapted to present a plurality of simulated rotating reels, and a simulated reel configurator in communication with the master gaming controller, the display device, or both. The plurality of simulated rotating reels can have a set of reel stops, including a first subset of reel stops comprising visible reel symbols and a second subset of reel stops comprising blanks. The simulated reel configurator can facilitate the display of the simulated rotating reels upon the display device, and can also be adapted to configure at least one of the simulated rotating reels such that one or more visible reel symbols within the first subset of reel stops are expanded into one or more adjacent reel stops, which may have other visible reel symbols or which may comprise ghost or blank reel stops. In the event that such adjacent reel stops are ghosts, then the sized or resized visible reel symbols are expanded into blank regions within one or more of the second subset of reel stops adjacent thereto, such that the amount of blank area within the second subset of reel stops is reduced thereby.

In various embodiments, a gaming reel adapted for use in a wager-based gaming machine is provided. Such a gaming reel can include a display region distributed about an outer circumference of the reel, a full set of reel stops arranged about the display region, a plurality of visible reel symbols corresponding to a first subset of reel stops selected from the full set of reel stops, and a plurality of ghosts comprising blank regions corresponding to a second subset of reel stops selected from the full set of reel stops. Each of the visible reel stops and each of the ghosts can corresponds to a single reel stop. Preferably, one or more of the visible reel symbols within the first subset of reel stops are expanded into one or more blank regions within one or more ghosts situated adjacent thereto, thereby reducing the amount of blank area within the second subset of reel stops. Such a gaming reel can comprise a physical reel adapted for used in a mechanical or electromechanical gaming machine, or alternatively can comprise a virtual reel adapted for use on a display screen in a processor-based gaming machine.

In various embodiments, a wager-based gaming machine comprising an exterior housing, a display region adapted to present a plurality of mechanical or simulated rotating reels and a plurality of gaming reels adapted to be rotated about an axis is provided. Such gaming reels can include those recited above having visible reel symbols that are expanded into one or more blank regions of adjacent blank reel stops. Such gaming machines can be mechanical, electromechanical or processor-based gaming machines adapted to display virtual or simulated rotating reels.

In various embodiments, a wager-based gaming system having a plurality of processor-based gaming machines is provided. Such gaming machines can include those recited above having virtual or simulated reels with visible reel symbols that are expanded into one or more blank regions of adjacent blank reel stops. The wager-based gaming system can also include a remote host in communication with each of the processor-based gaming machines, with the remote host being adapted to download reel symbols, virtual reel strips, or both to the networked gaming machines. The wager-based gaming system can also include at least one simulated reel configurator in communication with the remote host, the gaming machines or both, with the simulated reel configurator being adapted to facilitate the display of simulated rotating reels and is also adapted to configure at least one of the simulated rotating reels such that one or more visible reel symbols are expanded into one or more blank regions of adjacent blank reel stops. A simulated reel configurator can be located at the remote host, within one or more of the gaming machines, or both.

Further features and items may also be found in any of the foregoing embodiments, and it will be readily appreciated that various combinations of the following features and items may be used. For example, some or all reel stops on a given reel can comprise an identical amount of space. In some embodiments, configuration of a gaming reel can include resizing said one or more of the visible reel symbols to a size that is larger than its original size. Such resizing can involve stretching an existing reel symbol in a direction that extends the stretched reel symbol into one or both reel stops adjacent to the reel stop containing the stretched reel symbol. Such resizing can also involve resulting reel symbols that are larger than the size of their respective reel stops. The gaming reel configurator can be located within a master gaming controller, elsewhere within the gaming machine, or at a location remote from the gaming machine. In some embodiments, the blank areas of substantially all of the subset of reel stops comprising blanks or ghosts are reduced in size via the expansion of one or more visible reel symbols. Such blank areas can be reduced in size by a set amount, such as about fifty percent. In some embodiments, a simulated reel configurator can be adapted to reconfigure a preset virtual reel strip having preset dimensions for each reel stop, visible reel symbol and blank.

In various embodiments involving a gaming machine, the gaming machine can also include a storage device in communication with the simulated reel configurator, with the storage device being adapted to store files with respect to resized or expanded reel symbols. Various gaming machine embodiments can also include a network interface coupling the gaming machine to various remotely located networked components, with such a network interface facilitating the downloading of reel symbols, virtual reel strips or both to the gaming machine. In such embodiments including a gaming machine with a network interface, the simulated reel configurator can be further adapted to reconfigure a downloaded reel symbol such that the downloaded and reconfigured reel symbol expands into one or more blank regions of an adjacent reel stop.

In further embodiments, various methods of presenting reel symbols on a reel-type wager-based gaming machine having blank reel stops may also be provided. Such methods can include the steps of selecting a gaming reel adapted for use in a wager-based game, determining which reel stops on the selected gaming reel depict visible reel symbols and which reel stops depict ghosts, and sizing two or more of the visible reel symbols that are adjacent to reel stops that depict ghosts such that the sizing results in the extension of the visible reel symbols into blank regions within the adjacent ghosts, thereby reducing the amount of blank area within the ghosts. As in some of the foregoing embodiments, the selected gaming reel can be adapted for a game involving the rotation of a plurality of rotating gaming reels, and/or the gaming reel can include a full set of equally sized reel stops distributed about an outer circumference thereof, with a plurality of visible reel symbols corresponding to a first subset of reel stops from said full set of reel stops, and with a plurality of ghosts comprising blank regions corresponding to a second subset of reel stops from said full set of reel stops. Each of the visible reel symbols and each of the ghosts can correspond to a single reel stop on the gaming reel. In some embodiments, substantially all of the visible reel symbols that are adjacent to reel stops that depict ghosts can be sized such that they extend into any adjacent blank regions.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive gaming reels and methods of presentation therefor.

DETAILED DESCRIPTION

Exemplary applications of apparatuses and methods according to the present invention are described as follows. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as definitive or limiting in scope or setting. Although these examples are described in sufficient detail to enable one skilled in the art to practice the invention, it will be understood that they are not limiting, such that other embodiments may be used and changes may be made without departing from the spirit and scope of the invention.

Described herein are various mechanical and electronic reel-based gaming machines adapted to present gaming reels having one or more blank reel stops. In particular, various processor-based gaming machines that emulate a mechanical reel wager-based slot machine are presented. These gaming machines can include a number of realistic adaptations, such as audio, video and/or physical adaptations, where each contributes to the perception of a mechanically driven reel slot machine. Although much of this detailed description is devoted to describing such embodiments with respect to electronic or processor-based gaming machines, it will be understood that many of the reel symbol resizing features and embodiments presented herein can be adapted for use with gaming machines having physical mechanical reels and reel strips. For example, such features and embodiments can be implemented with respect to the creation of a physical reel strip having reel symbols.

Gaming Machines

Figure 1:
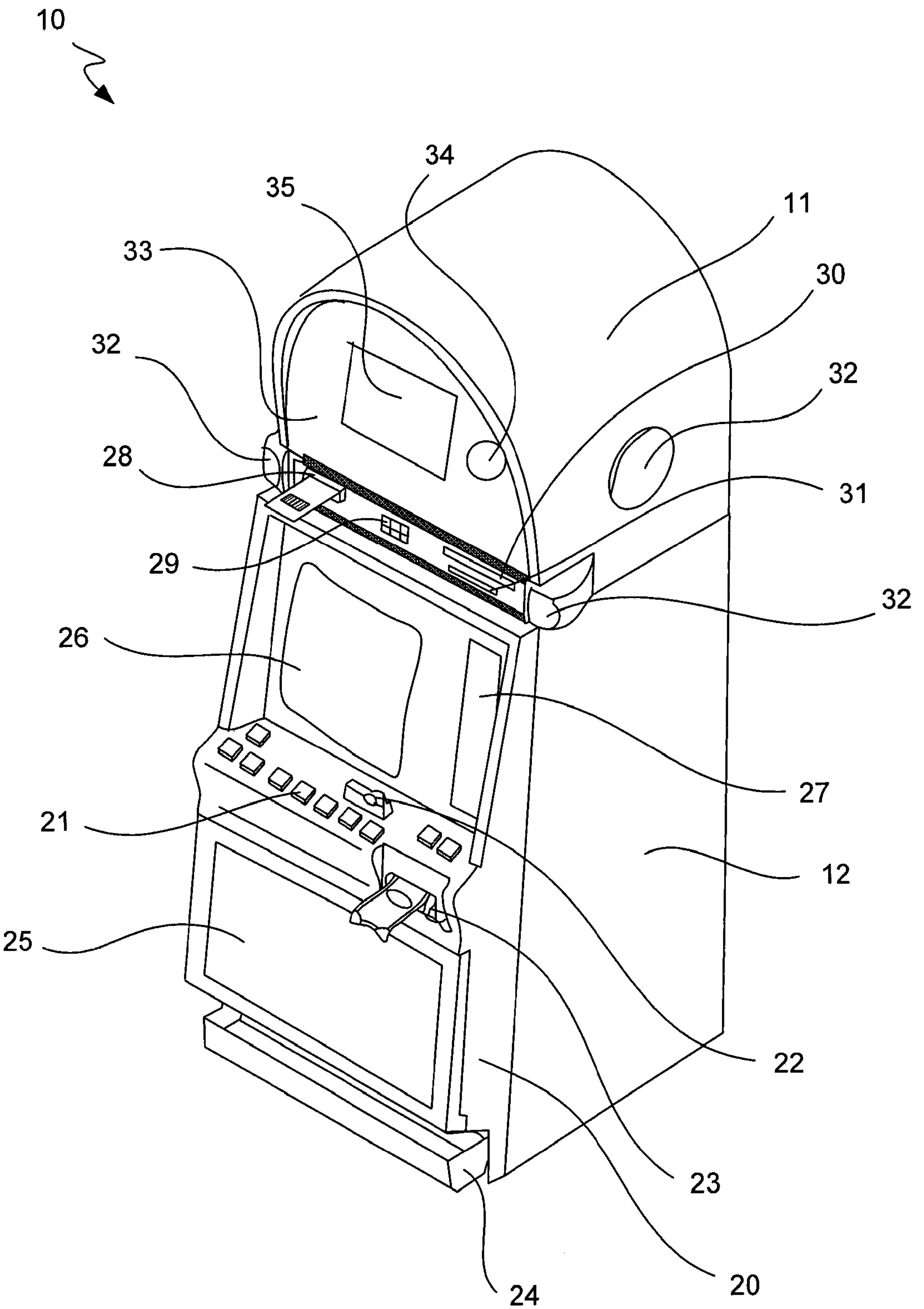
FIG. 1 illustrates in perspective view an exemplary gaming machine.

Referring first to FIG. 1, an exemplary processor-based gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, which collectively form a button panel, one or more money or credit acceptors, such as a coin acceptor 22 and a bill or ticket validator 23, a coin tray 24, and a belly glass 25. Viewable through main door 20 is a primary video display monitor 26 adapted to present a game and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket dispenser 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. Other features and functions may also be used in association with gaming machine 10, and it is specifically contemplated that the present invention can be used in conjunction with such a gaming machine or device that might encompass any or all such additional types of features and functions. In various preferred embodiments, gaming machine 10 can be adapted to present a video simulation of a reel based slots game involving a plurality of gaming reels.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage-monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security-monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

General Gaming Network and System Configurations

Figure 2:
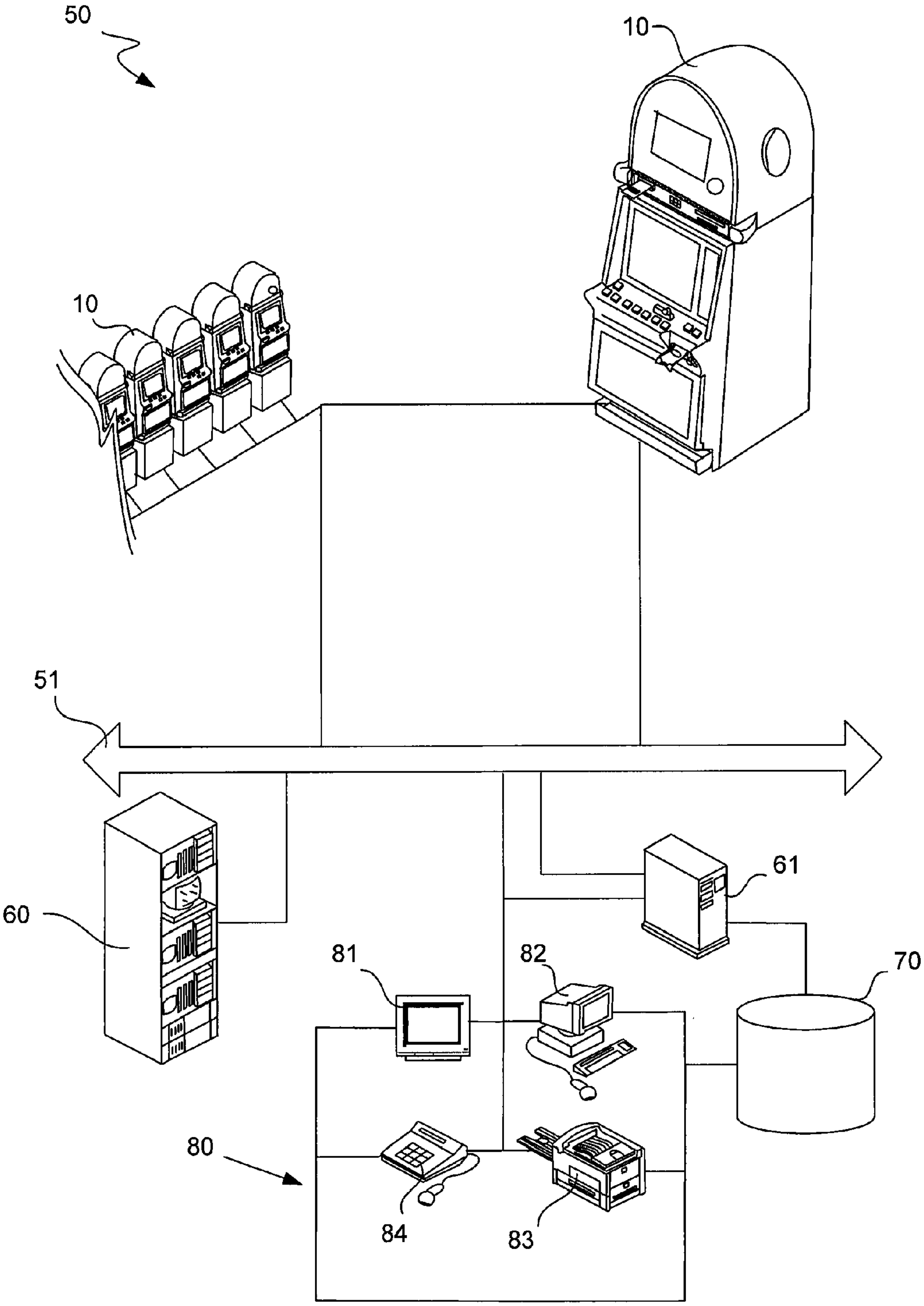
FIG. 2 illustrates in block diagram format an exemplary network infrastructure for providing a gaming system having one or more gaming machines.

Continuing with FIG. 2, an exemplary network infrastructure for providing a gaming system having one or more gaming machines is illustrated in block diagram format. Exemplary gaming system 50 has one or more gaming machines, various communication items, and a number of host-side components and devices adapted for use within a gaming environment. As shown, one or more gaming machines 10 adapted for use in gaming system 50 can be in a plurality of locations, such as in banks on a casino floor or standing alone at a smaller non-gaming establishment, as desired. Common bus 51 can connect one or more gaming machines or devices to a number of networked devices on the gaming system 50, such as, for example, a general-purpose server 60, one or more special-purpose servers 61, a sub-network of peripheral devices 80, and/or a database 70.

A general-purpose server 60 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 50 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 50 can be isolated from any other network at the establishment, such that a general-purpose server 60 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a ticket validator or other security identifier, among others. Similarly, under either embodiment of an isolated or shared network, at least the specialized server 61 or another similar component within a general-purpose server 60 also preferably includes a connection to a database or other suitable storage medium 70. Database 70 is preferably adapted to store many or all files containing pertinent data or information for a particular purpose, such as, for example, data regarding visual image data, video clips, other displayable items, and/or related data, among other potential items. Files, data and other information on database 70 can be stored for backup purposes, and are preferably accessible at one or more system locations, such as at a general-purpose server 60, a special purpose server 61 and/or a cashier station or other sub-network location 80, as desired.

In some embodiments, one or both of general-purpose server 60 and special purpose server 61 can be adapted to download various games to one or more gaming machines 10. Such downloaded games can include reel-based slots type games, with various reel symbols and reel stop locations for such symbols being downloaded to the gaming machine or machines 10. Such downloads can occur based on a request or command from a player or a casino operator, or can take place in an automated fashion by system 50, such as via a particular prompt or trigger. In the event that reel symbols and reel stops are downloaded, such items may include one or more blank or ghost reel stops, as might pertain to a given reel-type game.

While gaming system 50 can be a system that is specially designed and created new for use in a casino or gaming establishment, it is also possible that many items in this system can be taken or adopted from an existing gaming system. For example, gaming system 50 could represent an existing cashless gaming system to which one or more of the inventive components or controller arrangements are added, such as controllers, storage media, and/or other components that may be associated with a dynamic display system adapted for use across multiple gaming machines and devices. In addition to new hardware, new functionality via new software, modules, updates or otherwise can be provided to an existing database 70, specialized server 61 and/or general-purpose server 60, as desired. Other modifications to an existing system may also be necessary, as might be readily appreciated.

Reel Symbol Resizing

As noted above, a typical reel-based gaming machine includes a plurality of reels that are each divided into numerous reel stops or symbol segments. Each of these reel stops are typically the same size, with one reel symbol per reel stop or symbol segment. Where the reel has empty reel stops (i.e., blanks or ghosts), the blank segments are the same size as the segments having actual reel symbols. For example, where a given reel strip might have 17 reel stops, with 10 of the reel stops having actual visibly apparent reel symbols, there would then be 7 different "blanks" or ghost regions having large amounts of blank or empty space. Overall, the 17 reel stops along the reel would be evenly spaced and of the same size. Of course, reels having a different number of reel stops and/or a different percentage of reel stops that are blanks can also be used.

Figure 3A:
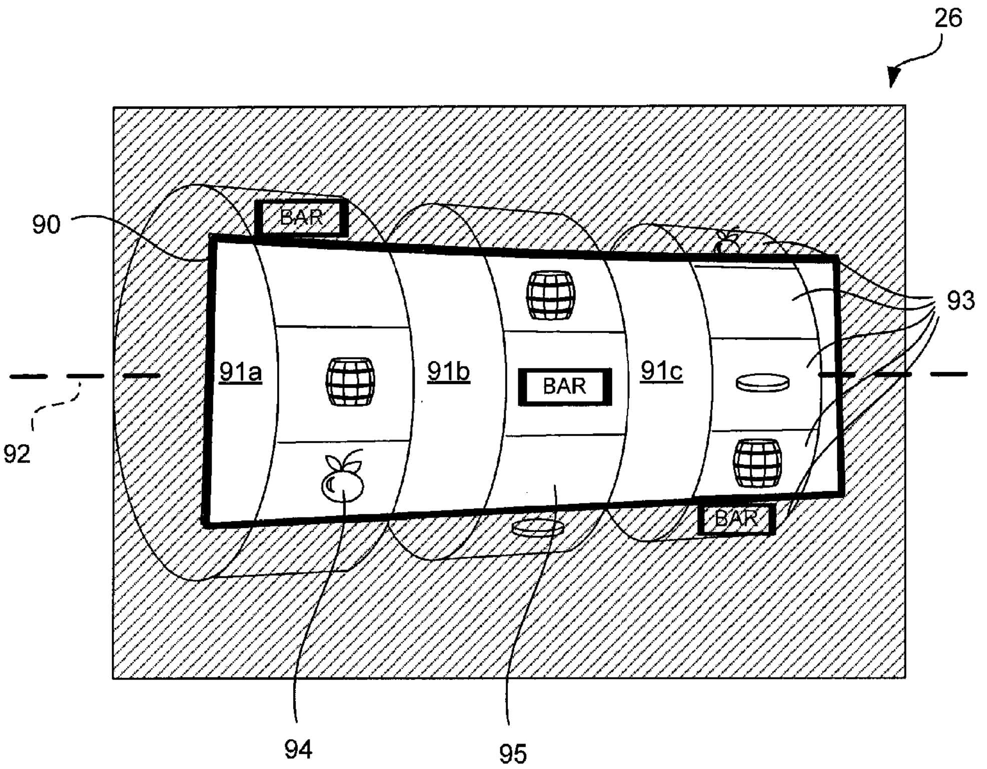
FIG. 3A illustrates in partial perspective view three exemplary adjacent rotating reels adapted for use in a gaming machine.
Figure 3B:
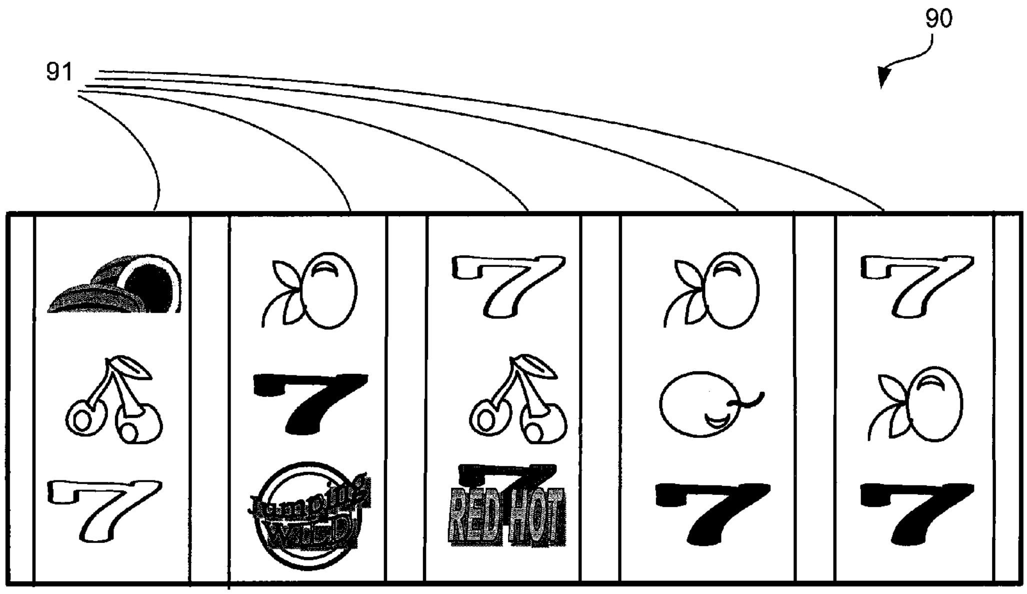
FIG. 3B illustrates a screenshot in front elevation view of five exemplary adjacent virtual rotating reels adapted for use in a processor-based gaming machine.

Turning now to FIGS. 3A and 3B, two different examples of adjacent rotating reels adapted for use in a gaming machine are presented. As will be readily appreciated, such adjacent rotating reels can be actual physical mechanical reels, such as the three adjacent reels presented in FIG. 3A, or they can be virtual reels emulated on the display of a processor based gaming machine, such as the five adjacent reels shown in the screenshot of FIG. 3B. It will be readily appreciated that many of the items and features involved in the presentation of such gaming reels are common to both physical mechanical reels and virtual simulated reels, such that the various exemplary items and features of both types of reels described herein can apply similarly to the other type of reel. For example, while the three reels of FIG. 3A are described here as physical mechanical reels, they might also be virtual (i.e., simulated mechanical) reels that could be shown on a video display 26 of processor-based gaming machine 10. In the event that a video display is not used, then item 26 of FIG. 3A can alternatively be a silk-screened glass or other display component having a viewing window 90 through which the reels are seen.

As shown in FIG. 3A, gaming reels 91*a*, 91*b* and 91*c* are adapted to rotate about a common axis 92, such as during game play. Each wheel has a plurality of reel stops 93, each of which contains one visible reel symbol 94 or only empty space comprising a "ghost" or "blank" 95. Each visible reel symbol 94 or blank 95 is generally contained within its own reel stop 93. Visible reel symbols 94 can include bars, fruits, coins, or barrels, as shown, and/or may also include a vast variety of other symbols suitable for use in a reel game, as will be readily appreciated. A viewing window 90 is adapted such that reels 91*a*, 91*b* and 91*c* can be seen therethough, and it will be understood that such a viewing window can be used on gaming machines that include mechanical reels and on those that include virtual reels on a video display. As can be seen, viewing window is adapted such that only some of the reel stops 93 may be seen, while others are hidden from view. For example, reel 91*c* has reel stops 93 containing a blank, a coin and a barrel that can be seen, and also reel stops containing a cherry and a bar that cannot be seen at the same time through viewing window 90. As shown, reels 91*a*, 91*b* and 91*c* are stopped such that a barrel, a bar and a coin are the visible reel symbols on the reel stops that have stopped across a center payline visible at the center of viewing window 90.

Although FIG. 3B depicts five adjacent virtual reels 91, there are many similarities with the mechanical reels of FIG. 3A. For example, each of the five virtual reels is visible through a viewing window 90, and various visible reel symbols from the reel stops of virtual reels 91 can be seen through the viewing window, while others cannot be seen therethrough at the same time. Reel symbols include cherries, watermelons, plums, oranges, other fruits and various numeral "7"s of different colors and designations, as well as "wild" symbols. Of course, many other specific reel symbols may also be used in addition to or instead of the examples that are illustrated. Unlike the three-reel example of FIG. 3A, the five-reel example of FIG. 3B does not include any reel stops that comprise ghosts or blank regions. As such, some of the embodiments of the present invention involving blank reel stops may not be as well suited for the exemplary gaming reels depicted in FIG. 3B, although other embodiments involving the highlighting of reel symbols regardless of blanks may be applicable. In general, many gaming reels, such as those shown in FIGS. 3A and 3B are configured such that three reel stops are in full view through the applicable viewing window. It will be understood, however, that other embodiments might be used that result in more or fewer reel stops per reel being visible at any given time, such as via different sizes in reel stops and/or the viewing window.

Figure 4:
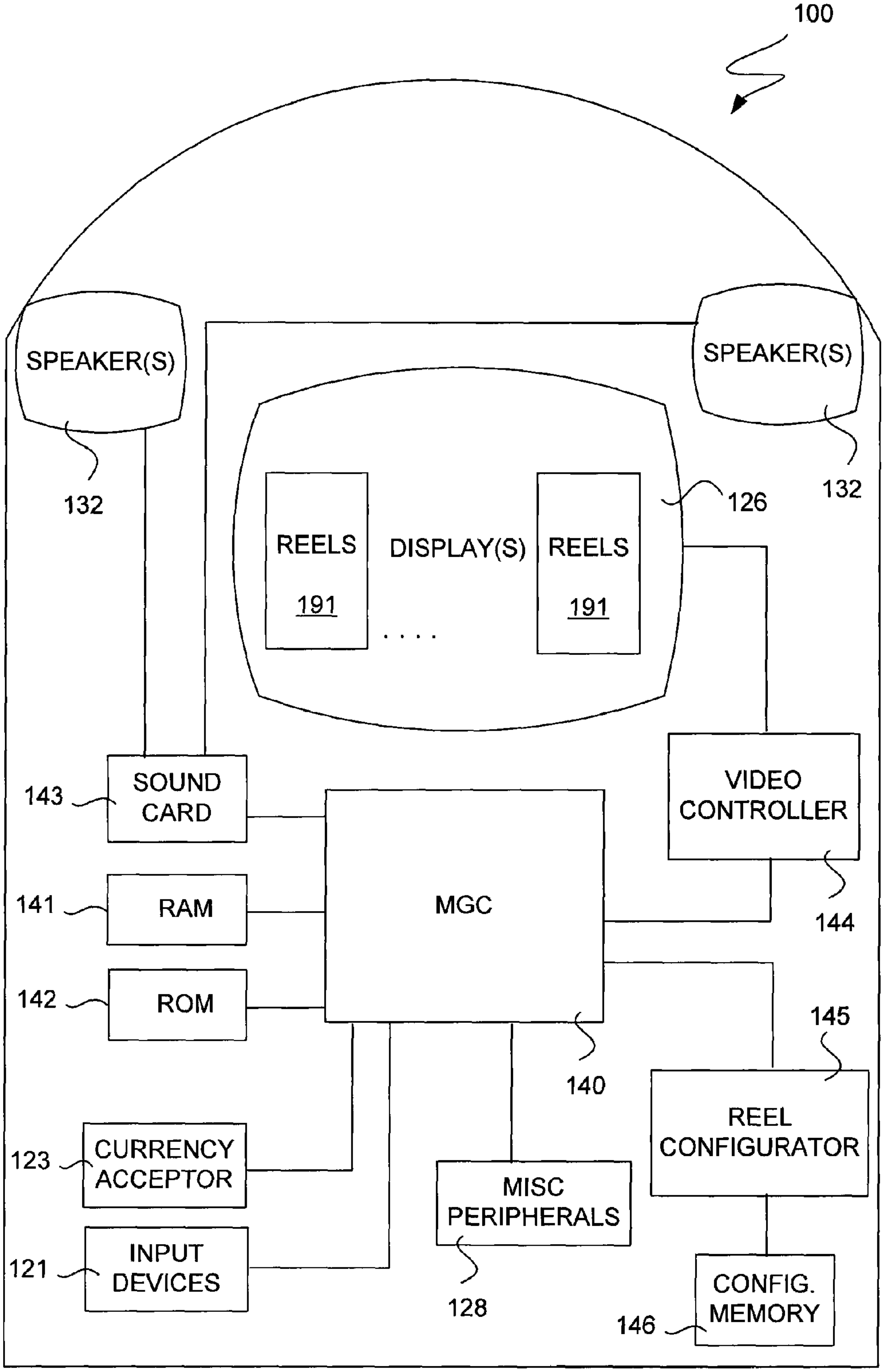
FIG. 4 illustrates in block diagram format various components of an exemplary processor-based gaming machine adapted to resize reel symbols according to one embodiment of the present invention.

In particular, some embodiments of the present invention relate to the reduction of blank areas on gaming reels having blanks or ghosts. This can be done by stretching or otherwise sizing or resizing visible reel symbols so that they extend into those reel stops that contain ghosts or blank areas. Some embodiments relate to the sizing or resizing of visible reel symbols regardless of blanks, such that one or more visible reel symbols can be highlighted, such as by being oversized. Such reel symbol sizing can be done via a specialized reel configurator, as set forth herein. Referring to FIG. 4, various components of an exemplary processor-based gaming machine adapted to resize reel symbols according to one embodiment of the present invention are illustrated in block diagram format. Processor-based gaming machine 100 contains many components that can be similar or identical to those set forth in gaming machine 10 above. For example, display(s) 126, speakers 132, input devices 121 and currency acceptor 123, as well as other peripheral devices 128, can correspond to similar items in gaming machine 10. One or more sound cards 143 can aid to drive speakers 132, and one or more video cards or controllers 144 can be used to drive display(s) 126, which display(s) are preferably adapted to present one or more gaming reels 191.

As noted above, a master gaming controller 140 adapted to execute or control one or more aspects of wager based games is in communication with various other gaming machine components, either directly or via other components. For example, while master gaming controller 140 might be in direct communication with various input devices or other peripherals, a video card or controller 144 can be interspersed between the master gaming controller and display 126, such that communication to the display is indirect. Various memory or storage components, designated as RAM 141 and ROM 142 might be accessible to master gaming controller 140, and such storage components may be dedicated to the master gaming controller, or could be shared by other gaming machine components.

In addition, a specialized simulated reel configurator 145 can be located within processor-based gaming machine 100. Preferably, simulated reel configurator 145 is adapted to configure one or more simulated rotating reels for presentation on a display 126 of gaming machine 100. This reel configurator 145 can be a dedicated processor located separately from master gaming controller 140, as shown in FIG. 4, so as to alleviate some of the burdens that are typically placed on the master gaming controller. Alternatively, this reel configurator can be contained within or even be a part of the master gaming controller itself (not shown). Such a processor could be, for example, the Pentium III chip made by Intel Corporation of Santa Clara, Calif., although other suitable processors can also be used. Reel configurator 145 may be in communication with (or within) master gaming controller 140, and also in communication with video controller 144 and/or display(s) 126.

On or more configurator storage units or memory devices 146 can be associated with reel configurator 145, and such configurator memory devices can be dedicated to the configurator or shared with other machine components. Such configurator memory devices 146 could be specific memory chips and/or also an internal hard disk drive, such as, for example, a 40 gigabyte model 6K040L0 hard drive made by Maxtor Corporation of Milpitas, Calif., although other suitable memory components can also be used. Such configurator memory devices 146 can be used to store files containing, for example, original and modified versions of visible reel symbols, original and modified versions of entire virtual reel strips, preferred parameter for ghost regions, and data with respect to regulatory requirements regarding blank reel stops, among other items.

In various embodiments, reel configurator 145 facilitates the display of simulated rotating reels upon display device 126, such as by configuring at least one simulated rotating reel such that one or more of the visible reel symbols thereupon are expanded into one or more ghosts or blank regions on that reel. The overall amount of blank area on the gaming reel or reels is reduced via this reel symbol sizing, such that the resulting reel presentation is more appealing to many players. In some embodiments, this can involve the original creation of visible reel symbols that are oversized and ghosts or blanks that are undersized with respect to the size of the reel stops for a new reel. In other embodiments, this can involve the resizing of visible reel symbols that are already present on an existing reel. For example, reel configurator 145 can be adapted to take existing reel symbols from an existing virtual reel strip, and stretch or otherwise expand those reel symbols so that they extend beyond the bounds of their respective reel stops.

As noted above, many reels from all types of reel-based gaming machines are made up of numerous equally sized and spaced reel stops. Use of this specialized reel configurator allows reel from such gaming machines to have visible reel symbols that are larger then the segment bounds for their respective reel stops. Where such reels have blanks or ghosts at some reel stops, this means that the visible reel symbols can intrude into the ghost reel stops and make the respective games more visually appealing. In cases where sizing or resizing is desired regardless of the existence of any blanks, various reel symbols can be oversized (i.e, stretched beyond their respective reel stop boundaries) simply as a way to emphasize specific reel symbols or reel symbol types. Such sizing or resizing of visible reel symbols allows the reel stop sizes to stay uniform, since only the graphical presentation of the visible reel symbols are stretched or otherwise sized. Accordingly, with respect to processor-based gaming machines and simulated reels, model and evaluation components of the code for reel stops need not be affected in many cases. However, changes to code with respect to existing visible reel symbols would likely be needed in most cases.

For example, where it is desired to stretch an existing visible reel symbol so that its vertical length doubles, the symbol script for that reel symbol can be altered on whatever scale or scales might be needed. Such a change might involve adding a particular line or lines of code to existing code for a reel symbol. For example, and depending on specific code elsewhere in the script, the following extra line could be added to the end of the script file for an existing virtual reel symbol:

"setRelativeScale (1.0f, 1.8f, 1.0f)"

Depending upon the particular code conventions and parameters used, such an added line may result in reel symbols that are stretched to about double in size in a vertical direction, but that are not stretched in any other direction. Of course, other specific lines of code may also be used, and such code changes may involve added lines and/or changes to existing lines of code. Different scales might be also used, and stretching in a horizontal or other direction might also be implemented, as desired.

As will be readily appreciated, such stretching or resizing of visible reel symbols can be made for many or all of the reel symbols on a given set of gaming reels. In many embodiments, it will be desirable to stretch or resize only those visible reel symbols that are adjacent to a ghost or blank reel stop, such that the stretched reel symbol is expanded into the ghost. Such an implementation can be aided in situations where particular code has designated ghosts or blank reel stops as "pure alpha," such that the resizing of adjacent visible reel symbols into the blank regions of the ghost does not involve any "tearing." Additional code can be included so that the reel configurator is adapted to identify only those visible reel symbols that are adjacent to blank reel stops, such that only those visible reel symbols are resized into the blank reel stops accordingly.

Figure 5A:
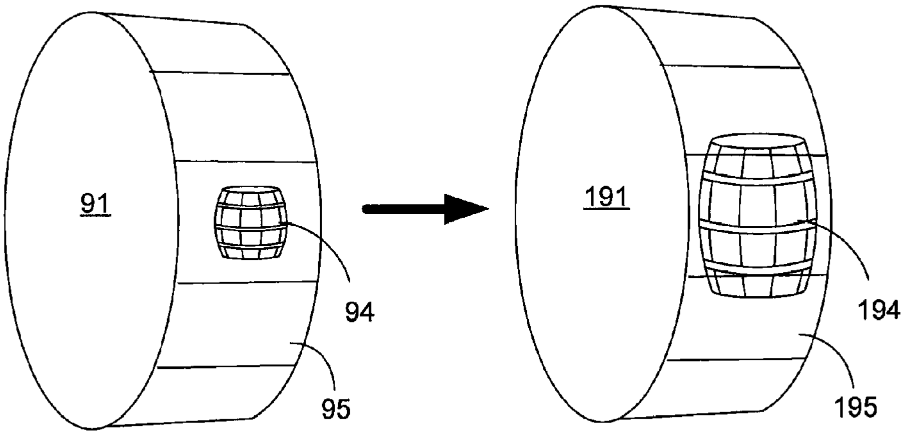
FIGS. 5A through 5C illustrate in perspective view various exemplary rotating reels having reel symbols that are resized according to one embodiment of the present invention.
Figure 5B:
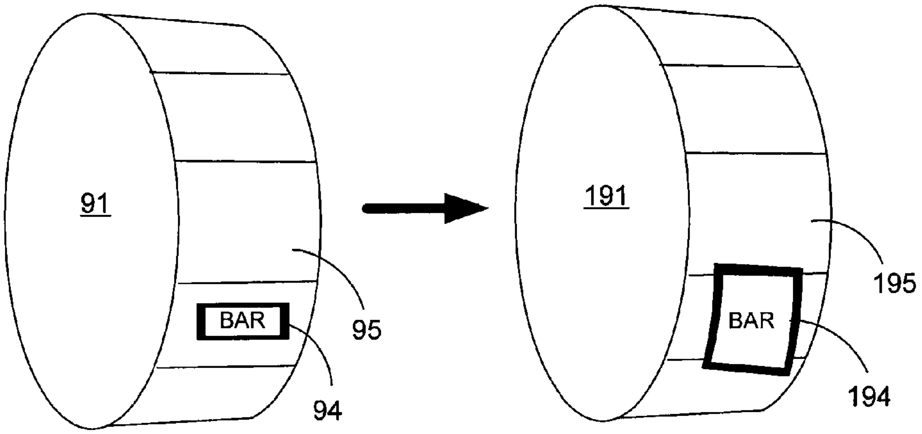
Figure 5C:
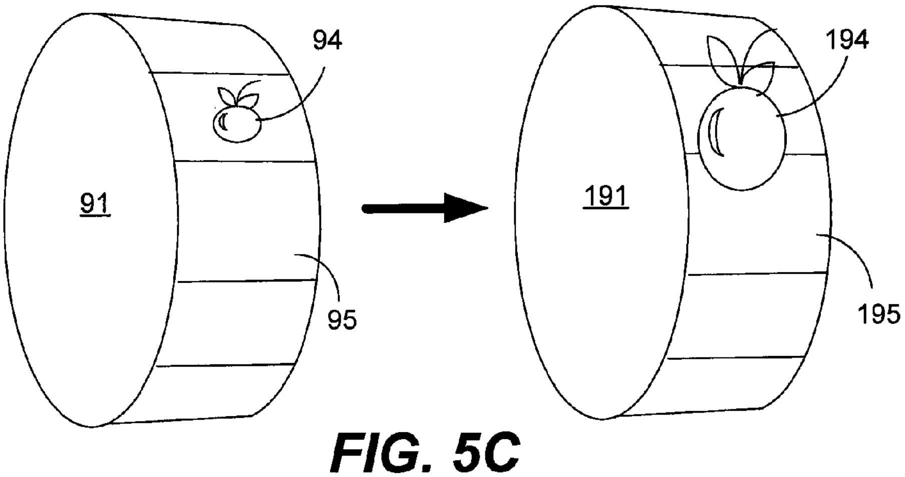

Examples of rotating reels having reel symbols that are resized according to various embodiments of the present invention are provided in perspective view in FIGS. 5A through 5C. In each figure, existing mechanical reel or virtual reel 91 is illustrated with a particular existing visible reel symbol 94 and an existing ghost or blank reel stop 95. As a result of a resizing process, the resultant reel 191 contains a resized visible reel symbol 194 that corresponds to old reel symbol 94, as well as a resulting blank reel stop 195 that is noticeably smaller than old blank reel stop 95. In each illustration, the resized visible reel symbol 194 has expanded beyond the bounds of its own particular reel stop and into the adjacent blank 195. In FIGS. 5A and 5C, the barrel and cherry reel symbols have been resized or stretched in both vertical and horizontal directions, such that it is noticeably larger in both dimensions. Conversely, the bar of FIG. 5B has only been resized in a vertical direction, such that it has been stretched into both adjacent blank reel stops, but not in a horizontal direction within its own reel stop. It will be readily understood that these illustrative examples only demonstrate a few possibilities, and that resizing of visible reel symbols can be made in one or more directions and with any type or kind of reel symbol. For example, the bar of FIG. 5B could be stretched horizontally as well, and the cherry and/or barrel could be stretched only in a vertical direction, if desired. Virtually all other kinds of visible reel symbols can be similarly resized as well.

In some embodiments, the blank areas of substantially all of the blank reel stops or ghosts are reduced in size via the expansion of any adjacent visible reel symbols. In this manner, much of the blank regions on the gaming reels are reduced, such that the reels are more visually appealing. Such blank areas can be reduced in size by a set amount, such as, for example, about fifty percent. Of course, other percentages may also be used, as may be desired. In some gaming jurisdictions, the size of blank reel stops may be limited by regulation or rule. Accordingly, it is preferable that any resizing of visible reel symbols does not result in any ghosts or blank reel stops that are too small or otherwise illegal. Further code restricting the maximum amount that visible reel strips can be stretched or otherwise resized can be contained within the reel configurator to control for such possibilities.

Figure 6A:
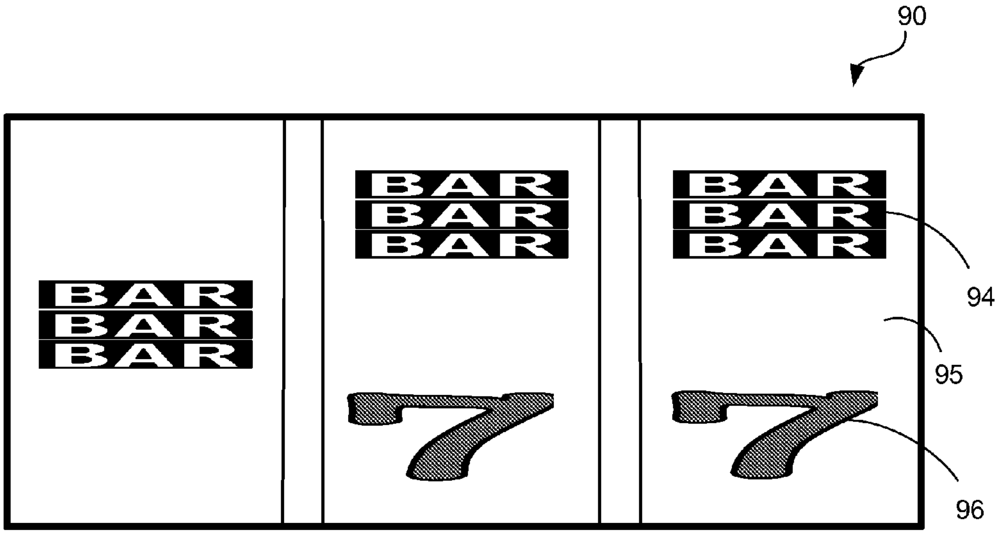
FIG. 6A illustrates a screenshot in front elevation view of three exemplary adjacent virtual rotating reels adapted for use in a processor-based gaming machine.
Figure 6B:
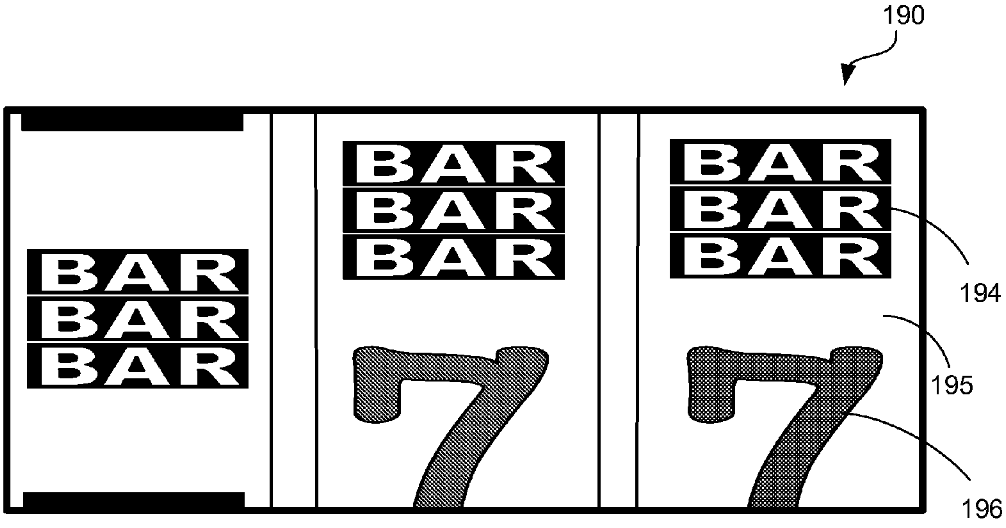
FIG. 6B illustrates a screenshot in front elevation view of the three exemplary reels of FIG. 6A after the visible reel symbols thereon have been resized according to one embodiment of the present invention.

Moving next to FIGS. 6A and 6B, further examples of the resizing of various reel symbols are illustrated in a screenshot format. In both figures, three exemplary adjacent virtual rotating reels adapted for use in a processor-based gaming machine are presented in front elevation view. FIG. 6A depicts the virtual reels prior to symbol resizing, while FIG. 6B depicts the virtual reels after symbol resizing. In FIG. 6A, viewing window 90 generally permits a view of three reel stops per reel, with one of a triple bar reel symbol 94, blank reel stop 95 and numeral "7" reel symbol 96 occupying each reel stop that can be seen. After a reel symbol resizing process, the results can be seen in the viewing window 190 of FIG. 6B. The triple bar reel symbols 194 and numeral "7" reel symbols 196 are decidedly larger, and the blank reel stops or ghosts 195 are decidedly smaller. As can be seen, the resized visible reel symbols 194, 196 have been stretched into adjacent blank reel stops 195, thereby reducing the size of the blank reel stops.

As will be readily appreciated, numerous variations can be practiced with respect to the resizing of visible reel symbols. For example, where a particular reel symbol is located at a reel stop that has only one adjacent ghost or blank region, a reel symbol resizing can be made that stretches that reel symbol only into the single adjacent ghost or blank reel stop. Such a variation might be preferred in the event that a reel has ghosts as well as visible reel symbols that are adjacent to visible reel symbols, and where it is desirable to avoid any unsightly "stacking" of visible reel symbols onto each other. Such a variation in the script code for any reel symbols that are so affected might include an appropriate scale adjustment, as well as a suitable location adjustment. For example, where a visible reel symbol that is adjacent to two blank reel stops might require only a scale adjustment, such that the reel symbol is stretched both upward and downward, another visible reel symbol that is adjacent to only one blank reel stop might require a same or similar scale adjustment, as well as a plus or minus distance component regarding its display location with respect to its own reel stop. This and/or other suitable programming features can be used to stretch a given visible reel symbol into one adjacent reel stop, but not another.

Although much of the focus herein has been made with respect to sizing or resizing visible reel symbols that are adjacent to blanks, it will be readily appreciated that such sizing or resizing of reel symbols is not limited to such instances. As one alternative, sizing of reel symbols can emphasize one or more particular reel symbols regardless of the existence or position of any blanks. A gaming machine operator or manufacturer may desire to "oversize" all of a particular reel symbol for a given game, such as, for example, all "wild 7s" or all "triple bars" on every reel of a game containing such reel symbols. In such cases, all of these particular reel symbols are sized or resized to stretch outside one or both boundaries of their respective reel stops, regardless of whether another reel symbol or a blank is adjacent thereto. In some embodiments, such an oversizing might be applied to only one visible reel symbol, which might be a particular bonus symbol for one or more game plays.

Such an oversizing of specific reel symbols and/or reel symbol types might be done as an overall theme for a particular game, or might be done as part of a limited time promotion involving that game. In some instances, the oversizing of one visible reel symbol into the reel stop of another visible reel symbol can result in an unsightly "stacking" of reel symbols, depending upon various symbol types, shapes colors and other factors. In such instances, it may be desirable to counteract any unsightly results by resizing the affected neighbor reel symbol, such as by resizing this other reel symbol to be smaller, to shift away from the enlarged adjacent reel symbol, or both. Various added code implementations and/or features to reduce the size and/or position of such a neighbor reel symbol to accommodate the oversizing of an adjacent reel symbol will be generally understood by those skilled in the art.

It will be readily appreciated that the various disclosures herein with respect to gaming machines, reels and methods involving the sizing or resizing of visible reel symbols can also be applied to wager-based gaming systems having networked gaming machines and other network components. Such systems can include components and configurations such as those described above with respect to FIG. 2. In particular, such a wager-based gaming system can include a remote host that is in communication with some or all of the processor-based gaming machines, with the remote host being adapted to download reel symbols, virtual reel strips, or both to the networked gaming machines. Where gaming machines are to be networked in such a wager-based gaming system, various gaming machine embodiments can also include a network interface (not shown) coupling the gaming machine to the system and its various remotely located networked components. Such a network interface would preferably facilitate the downloading of reel symbols, virtual reel strips or both to the gaming machine Such reel symbols and/or reel strips can be stored, for example, at database 70, and then be made available to various gaming machines within the gaming system. Storage of various virtual reel symbols and entire virtual reels or reel strips can be made with respect to both original versions and one or more resized versions thereof. As such, resizing of the same reel symbol or reel strip can be done in different scales, with each such resizing being used and/or stored separately. Such different versions might be desirable, for example, where one gaming jurisdiction limits the minimum size of a ghost region but another does not. In such a gaming system, the sizing or resizing of visible reel symbols and/or entire reel strips can be done before or after a download from a remote host to a given gaming machine.

Such resizing can be done by a network component, such as at the remote host, or within an individual gaming machine. Accordingly, a simulated reel configurator may be located at the remote host, or elsewhere within the gaming system and outside of an individual gaming machine. Such a remotely located reel configurator could be beneficial to an overall system, particularly where such a system might have gaming machines that are not equipped with reel configurators themselves. For example, where it is desirable for a system gaming machine to provide a reel-type game having reels with blanks that are minimized, a reel configurator on the network could provide appropriate reel symbol resizing where the gaming machine is not equipped to do such resizing itself.

In some embodiments, reel configurators can be located both within individual gaming machines, as detailed above, and also on one or more system components, such as at a remote host. Whether a reel configurator is located on a system component or within a gaming machine, it is preferable that such a reel configurator be able to take an input of an existing or preset virtual reel and reconfigure that existing or preset virtual reel such that its visible reel symbols are resized into adjacent blank regions. A resultant "reconfigured" or "resized" virtual reel can then be used by one or more system gaming machines, and can also be stored for future use. Such storage might be on a system storage component, such as database 70, and/or at a local gaming machine storage device, such as at configurator memory 146. Thus, where a preset virtual reel or reel strip has preset dimensions for each reel stop, visible reel symbol, blank, and respective locations thereof, the reel configurator would be adapted to read these dimensions and locations, and resize the various existing visible reel strips accordingly.

In a particular illustrative example, an existing virtual gaming reel may have 17 reel stops, numbered sequentially. Out of these 17 reel stops, reel stop positions 4, 7, 11, 13 and 16 have blank reel stops. Upon receiving the file or files for this existing virtual gaming reel, a reel configurator can automatically determine that blanks exist at the five given positions, and can then set about to reconfigure the visible reel symbols at all reel positions adjacent thereto—notably those symbols at reel stop positions 3, 5, 6, 10, 12, 14, 15 and 17. As will be readily appreciated, all of the reel symbols in this example will only be resized in one direction into an adjacent blank, with the exception of the reel symbol at reel stop position 12, which will be stretched in both directions. It will also be readily appreciated that this is only one illustrative example, and that the possible variations and combinations regarding the number of reel stops, the number of blanks and the locations of those blanks are virtually limitless. It is to be understood that the present invention contemplates the resizing of reel symbols for any and all such alternative reel configurations.

Figure 7:
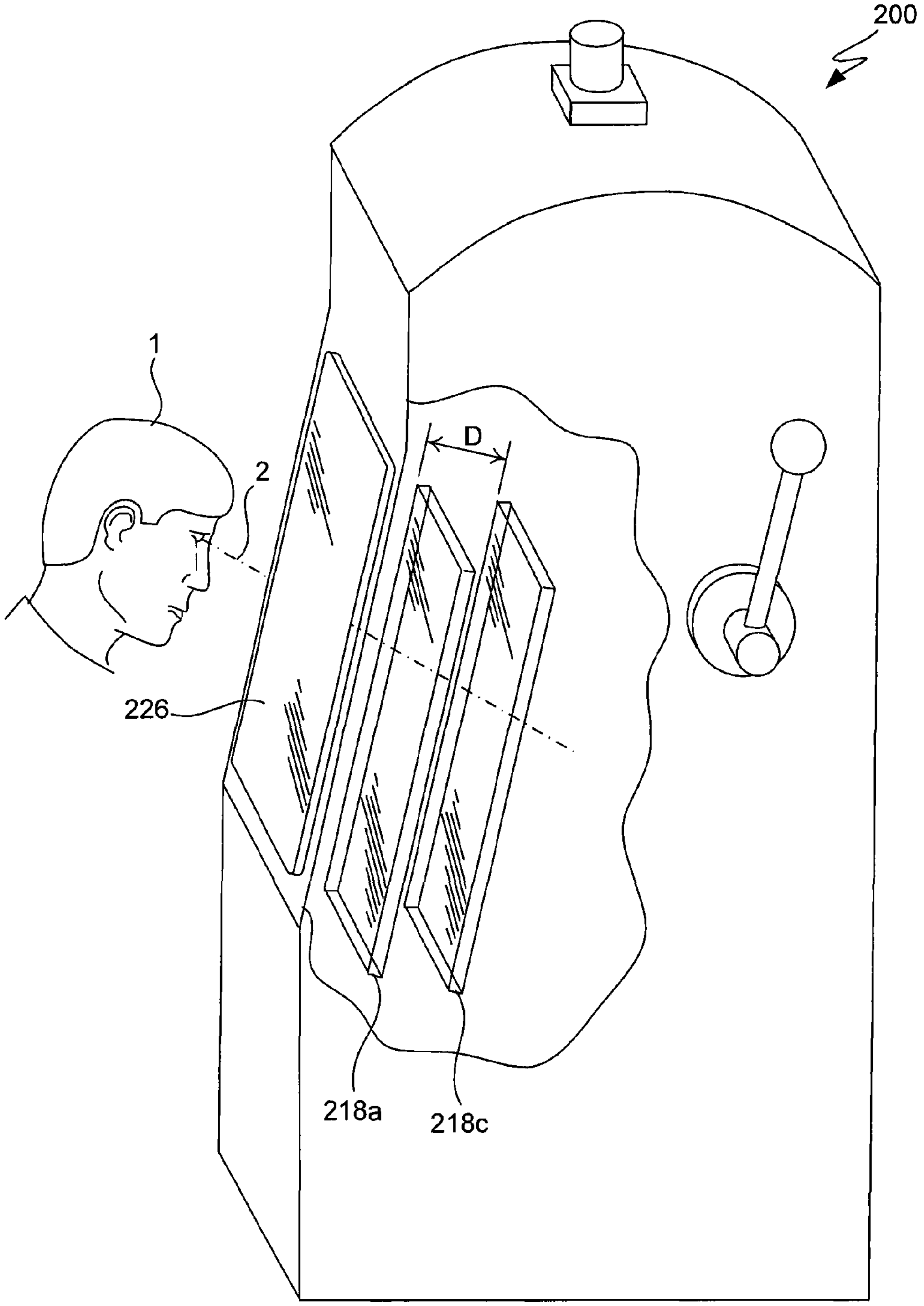
FIG. 7 illustrates in partial perspective and cut-away view an exemplary processor-based gaming machine having a multi-layer display according to one embodiment of the present invention.

Turning now to FIG. 7, an exemplary processor-based gaming machine having a multi-layer display according to one embodiment of the present invention is illustrated in partial perspective and cut-away view. Although the various visible reel symbol resizing machines, devices, systems and methods set forth herein can be used on any type of reel-based gaming machine, it is specifically contemplated that such devices and techniques can be applied to a gaming machine having a multi-layer display, such as multi-layer display gaming machine 200.

Such layered displays in a gaming machine can include those that are from or similar to, for example, that which is commercially available from Pure Depth of Redwood City, Calif. The Pure Depth technology incorporates two or more LCD displays into a physical unit, where each LCD display is separately addressable to provide separate or coordinated images between the LCDs. Many Pure Depth display systems include a high-brightened backlight, a rear image panel, such an active matrix color LCD, a diffuser, a refractor, and a front image plane; these devices are laminated to form a stack. The LCDs in these units are stacked at set distances, such as distance "D." As well as the binocular depth cue, Pure Depth units feature intrinsic motion parallax, where the x and y distance changes between objects displayed on different video planes depending on viewing angle. In addition, separate focal planes may literally be brought in and out of focus depending on the focal length of the lens in the viewer's eye.

The layered display devices 218*a*, 218*c*, which may be layered LCD devices, for example, may be used in a variety of manners to output games on a gaming machine. In some cases, video data and images displayed on the display devices 218*a* and 218*c* are positioned such that the images do not overlap (that is, the images are not superimposed). In other instances, the images overlap. It should also be appreciated that the images displayed on the display screen can fade-in fade out, pulsate, move between screens, and perform other inter-screen graphics to create additional affects, if desired. Additional layers of display devices may also be introduced, although the present description will continue with just two layered display devices for purposes of simplicity here.

In a specific embodiment, display devices 218*a* and 218*c* display co-acting or overlapping images to a person or viewer 1 looking at the display devices at a front display screen 226 and along a line-of-sight 2. For example, front display device 218*a* may display paylines in transparent portions that illuminate winning combinations of reels disposed on display device 218*c*. With respect to further examples, it is again noted that external loading and changing of simulated reel games can be had with gaming machine 200, such as described above with respect to wager-based gaming system 50. This can permit a casino or gaming establishment to change video on each of the layered display devices, and their transparency, without physically altering the gaming machine or requiring maintenance. Thus, the number of virtual slot reels may be changed from 3 to 5 to 9, or some other number. In this case, each display device 218*a*, 218*c* can change the position of its viewing window for viewing of the different number of virtual slot reels. Symbols on each virtual slot reel may also be changed. Also, a pay table shown on front display device 218*a* may be changed at will, in addition to changing whether a bonus or progressive game is shown on the back display device 218*c*, for example. This permits the same gaming machine 200 to play new games simply by downloading data onto the machine.

As will be readily appreciated, the layered display devices 218*a*, 218*c* may be used in a wide variety of manners to output games on a gaming machine. In some cases, video data and images displayed on the display devices 218*a* and 218*c* are positioned such that the images do not overlap, while in other instances, the images do overlap. It should also be appreciated that the images displayed on the display screen can fade-in fade out, pulsate, move between screens, and perform other inter-screen graphics to create additional affects, if desired. The multiple display devices may each display their own graphics and images, or cooperate to provide coordinated visual output. Objects and graphics in a game may then appear on any one or multiple of the display devices, where reels and other graphics on the front screen 218*a* blocks the view objects on the back screen 218*c*, depending on the position of the viewer relative to the screens. This provides actual perspective between the graphics objects, which represents a real-life component of 3D visualization.

In some embodiments, the multiple display devices output video for different games or purposes. For example, one display device may output a reel game, while another display device outputs a bonus game or pay table associated with the other display, while still another display device provides a progressive game or is reserved for player interaction and video output with a touchscreen. Other combinations may be used, as may be desired.

Reel games output by the display devices in such a multi layer display may include any video game that portrays one or more reels. Typically, the gaming machine simulates 'spinning' of the video reels using motion graphics for the symbols on the reel strips and motion graphics for the mechanical components. The virtual reel for such a game can be reels that have had visible reel symbols sized or resized according to any of the embodiments described herein. In various particular embodiments, the resizing of visible reel symbols may be made to account for any special effects that are desired through the use of a multi layer display. For example, the sizing or resizing of reel symbols that are to displayed on front layered display 218*a* might be more exaggerated that the resizing of the same or similar reel symbols that are to be displayed on back layered display 218*c*, or vice versa, depending upon the visual effects that are desired.

Method of Use

It will be readily appreciated that the method and illustrative flowchart provided herein are merely exemplary, and that the present invention may be practiced in a wide variety of suitable ways. While the provided flowchart may be comprehensive in some respects, it will be readily understood that not every step provided is necessary, that other steps can be included, and that the order of steps might be rearranged as desired by a given manufacturer, as desired.

Figure 8:
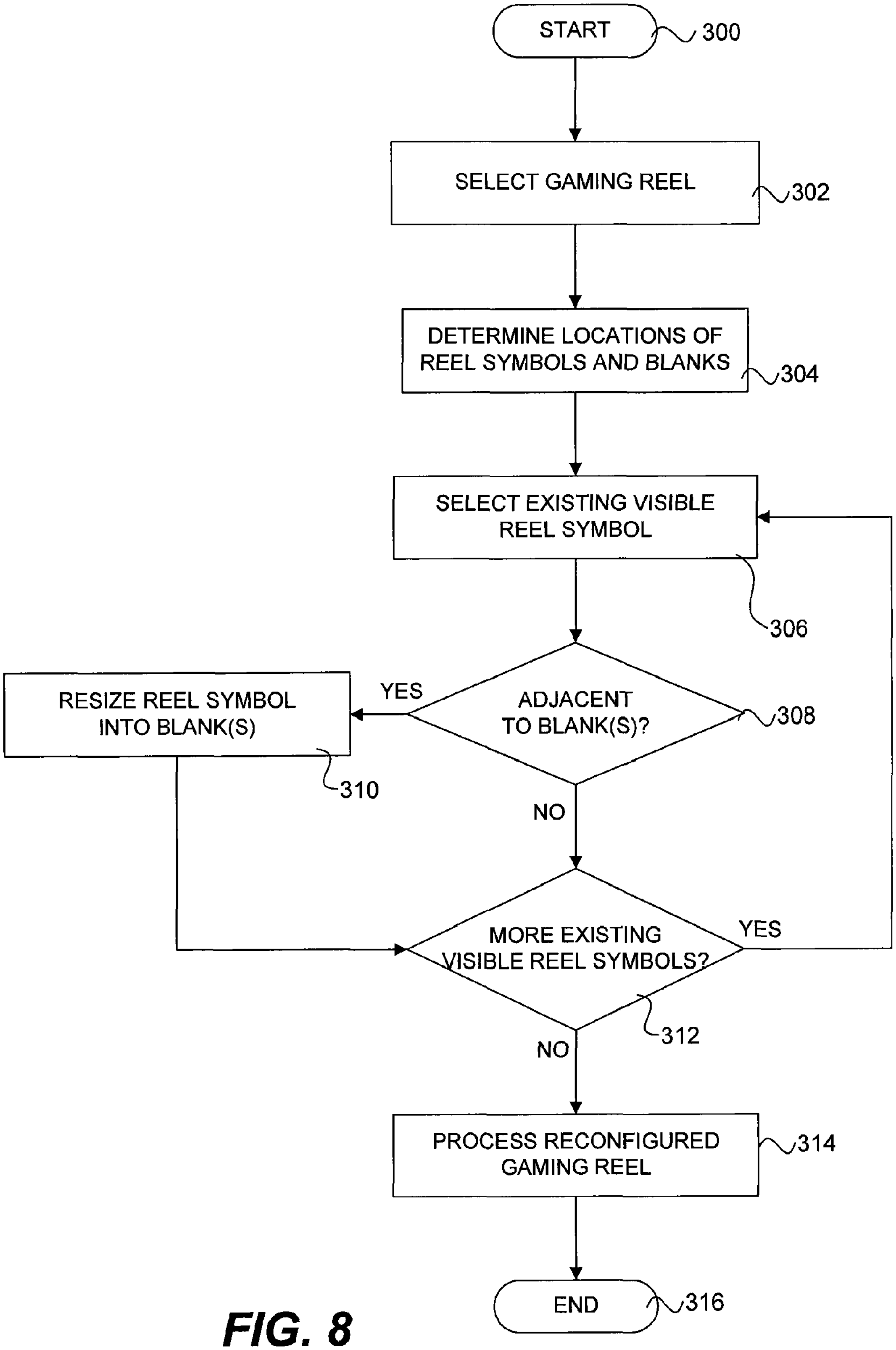
FIG. 8 illustrates a flowchart illustrating an exemplary method of presenting reel symbols on a reel-type wager-based gaming machine having blank reel stops according to one embodiment of the present invention.

Specifically, FIG. 8 illustrates a flowchart illustrating an exemplary method of presenting reel symbols on a reel-type wager-based gaming machine having blank reel stops according to one embodiment of the present invention. Such a method serves to illustrate an automated process whereby a specialized reel configurator resizes reel symbols for an existing virtual reel or reel strip, for example. The method may also be applied to the creation of reel strips, such as the original creation of a reel strip for a mechanical reel, or the original design of graphics for a virtual reel.

After start step 300, a first process step 302 involves selecting a gaming reel. Such a gaming reel can be, for example, any of the exemplary virtual or physical mechanical gaming reels as described above, such as a virtual gaming reel being downloaded to a system gaming machine, for instance. Such a selection may also involve a new gaming reel. Process step 304 then involves determining the locations of visible reel symbols and blanks on the various reel stops on the selected reel. Once the configuration of reel symbols and blanks on the various reel stops of the reel are determined, an existing visible reel symbol is selected at process step 306.

At a subsequent decision step 308, an inquiry is made as to whether the selected visible reel symbol is adjacent to any ghost or blank reel stops. If so, then the process moves to process step 310, where the selected visible reel symbol is sized or resized into one or more of the adjacent blanks accordingly. After such a sizing or resizing, or a determination that no such sizing or resizing is needed, the process then continues to decision step 312, where an inquiry is made as to whether there are any more visible reel symbols on the selected gaming reel that have yet to be considered. If so, then the method reverts to process step 306, and steps 306 through 312 are repeated. Once all visible reel symbols have been accounted for, then the process moves on to process step 314, where the entire reconfigured gaming reel is processes. Such a process can involve storing the reconfigured gaming reel to a memory component either on a gaming machine or on the system, and/or may involve forwarding the reconfigured gaming reel for use by the master gaming controller and/or for display as part of the reel game on the gaming machine. After process step 314, the method then finishes at end step 414. Of course, additional steps may also apply to such a process, as may be desired.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A processor-based gaming machine adapted for accepting a wager, playing a game based on the wager and granting a payout based on a result of the game, comprising:

an exterior housing arranged to contain a plurality of internal gaming machine components therein;

a master gaming controller in communication with at least one of said plurality of internal gaming machine components and adapted to execute or control one or more aspects of said wager based game;

a display device in communication with said master gaming controller and adapted to present a plurality of simulated rotating reels, said display device including a viewing window and said plurality of simulated rotating reels including a set of reel stops, wherein said set of reel stops includes a first subset of reel stops comprising visible reel symbols and a second subset of reel stops comprising blank regions; and a simulated reel configurator in communication with at least one of said master gaming controller and said display device, wherein said simulated reel configurator is adapted to facilitate the display of said plurality of simulated rotating reels through said viewing window of said display device, and wherein said simulated reel configurator is adapted to configure at least one of said plurality of simulated rotating reels such that one or more visible reel symbols within said first subset of reel stops are stretched to change the size of the one or more visible reel symbols such that the one or more visible reel symbols are expanded into one or more blank regions of said second subset of reel stops adjacent thereto, thereby creating expanded reel symbols and reducing the amount of blank space occupied by the blank regions within said second subset of reel stops that may be seen by a player through said viewing window when movement of said at least one of said plurality of simulated rotating reels has stopped.

2. The processor-based gaming machine of claim 1, wherein each reel stop within both of said first and second subsets of reel stops comprises an identical amount of space.

3. The processor-based gaming machine of claim 1, wherein said stretching to change the size of the one or more visible reel symbols includes resizing said the one or more visible reel symbols to a size that is larger than an original size thereof.

4. The processor-based gaming machine of claim 3, wherein said stretching involves expanding said one or more visible reel symbols in a direction that extends said stretched reel symbol into one or both reel stops adjacent to the reel stop containing said one or more visible reel symbols.

5. The processor-based gaming machine of claim 1, wherein said simulated reel configurator is located within said master gaming controller.

6. The processor-based gaming machine of claim 1, wherein the blank regions of substantially all of said second subset of reel stops are reduced in size via said stretching of said one or more visible reel symbols.

7. The processor-based gaming machine of claim 6, wherein each of said blank regions are reduced in size by about fifty percent.

8. The processor-based gaming machine of claim 1, wherein said simulated reel configurator is further adapted to reconfigure a preset virtual reel strip, used by the one or more simulated rotating reels, having preset dimensions for each reel stop, visible reel symbol, and blank region.

9. The processor-based gaming machine of claim 1, further including:

a storage device in communication with said simulated reel configurator, said storage device adapted to store a plurality of files with respect to the expanded reel symbols.

10. The processor-based gaming machine of claim 1, further including:

a network interface coupling said gaming machine to one or more remotely located networked components, said network interface adapted to facilitate the downloading of visible reel symbols, virtual reel strips or both to said gaming machine.

11. The processor-based gaming machine of claim 10, wherein said simulated reel configurator is further adapted to reconfigure a downloaded visible reel symbol such that said reconfigured visible reel symbol stretches and expands into one or more blank regions of an adjacent reel stop.

12. A gaming reel adapted for use in a wager-based gaming machine, comprising:

a display region distributed about an outer circumference of said reel;

a full set of reel stops arranged about said display region; a plurality of visible reel symbols corresponding to a first subset of reel stops selected from said full set of reel stops, wherein each of said plurality of visible reel symbols corresponds to a single reel stop from said first subset of reel stops, and wherein said visible reel symbols are viewable through a viewing window associated with said display region; and a plurality of ghosts comprising blank regions corresponding to a second subset of reel stops selected from said full set of reel stops, wherein each of said plurality of ghosts corresponds to a single reel stop from said second subset of reel stops;

wherein, during use of the gaming reel in said wager-based gaming machine, a reel configurator enables one or more of said visible reel symbols within said first subset of reel stops to be stretched to change the size of the one or more visible reel symbols such that the one or more visible reel symbols are expanded into one or more blank regions within one or more of said plurality of ghosts situated adjacent thereto, thereby creating expanded reel symbols and reducing the amount of blank space occupied by the blank regions within said second subset of reel stops that may be seen by a player through said viewing window when movement of said one or more visible reel symbols has stopped.

13. The gaming reel of claim 12, wherein said gaming reel comprises a physical reel adapted for use in a mechanical or electro-mechanical gaming machine.

14. The gaming reel of claim 12, wherein said gaming reel comprises a virtual reel adapted for use on a display screen in a processor-based gaming machine.

15. The gaming reel of claim 12, wherein each reel stop within both of said first and second subsets of reel stops comprises an identical amount of space.

16. The gaming reel of claim 12, wherein said stretching to change the size of the one or more visible reel symbols includes resizing at least one of said plurality of visible reel symbols to a size that is larger than an original size thereof.

17. The gaming reel of claim 16, wherein the amount of space occupied by the expanded reel symbols in the display region is larger than the amount of space occupied by a reel stop in the display region.

18. A method of presenting reel symbols on a reel-type wager-based gaming machine having reel stops with blank regions, comprising:

selecting a gaming reel adapted for use in a wager-based game involving the rotation of a plurality of rotating gaming reels viewable through a viewing window, said gaming reel including (i) a full set of equally sized reel stops distributed about an outer circumference thereof, (ii) a plurality of visible reel symbols corresponding to a first subset of reel stops selected from said full set of reel stops, wherein each of said plurality of visible reel symbols corresponds to a single reel stop from said first subset of reel stops, and (iii) a plurality of ghosts comprising blank regions corresponding to a second subset of reel stops selected from said full set of reel stops, wherein each of said plurality of ghosts corresponds to a single reel stop from said second subset of reel stops;

determining which reel stops from said full set of reel stops depict visible reel symbols and which reel stops from said full set of reel stops depict ghosts; and resizing two or more of said visible reel symbols that are adjacent to reel stops that depict ghosts, wherein said sizing results in the stretching of the two or more of said visible reel symbols to change their size and extend said two or more visible reel symbols into one or more blank regions within one or more of said ghosts adjacent thereto, thereby creating expanded visible reel symbols and reducing the amount of blank space occupied by the blank regions within said ghosts that may be seen by a player through said viewing window when movement of said two or more visible reel symbols has stopped.

19. The method of claim 18, wherein substantially all of said visible reel symbols that are adjacent to reel stops that depict ghosts are resized such that they extend into any adjacent blank regions within one or more of said ghosts adjacent thereto.

20. A wager-based gaming machine, comprising:

an exterior housing arranged to contain a plurality of internal gaming machine components therein;

a display device adapted to present a display of plurality gaming reels through a viewing window; and a plurality of gaming reels adapted to be rotated about an axis, wherein at least one of said plurality of gaming reels includes:

a display surface distributed about an outer circumference thereof, a full set of reel stops arranged about said display surface, a plurality of visible reel symbols corresponding to a first subset of reel stops selected from said full set of reel stops, wherein each of said plurality of visible reel symbols corresponds to a single reel stop from said first subset of reel stops, and a plurality of ghosts comprising blank regions corresponding to a second subset of reel stops selected from said full set of reel stops, wherein each of said plurality of ghosts corresponds to a single reel stop from said second subset of reel stops;

wherein, during use of the gaming reel in said wager-based gaming machine, a reel configurator enables one or more of said visible reel symbols within said first subset of reel stops to be stretched to change the size of the one or more visible reel symbols such that the one or more visible reel symbols are expanded into one or more blank regions within one or more of said plurality of ghosts situated adjacent thereto, thereby creating expanded reel symbols and reducing the amount of blank space occupied by the blank regions within said second subset of reel stops that may be seen by a player through said viewing window when movement of said one or more visible reel symbols has stopped.

21. The wager-based gaming machine of claim 20, wherein said wager-based gaming machine comprises a mechanical or electro-mechanical gaming machine.

22. The wager-based gaming machine of claim 20, wherein said wager-based gaming machine comprises a processor-based gaming machine.

23. A wager-based gaming system, comprising:

a plurality of processor-based gaming machines adapted for accepting a wager, playing a game based on the wager and granting a payout based on a result of the game, each of said plurality of processor-based gaming machines including:

an exterior housing arranged to contain a plurality of internal gaming machine components therein, a master gaming controller in communication with at least one of said plurality of internal gaming machine components and adapted to execute or control one or more aspects of said wager based game, and a display device in communication with said master gaming controller and adapted to present a plurality of simulated rotating reels, said display device including a viewing window and said plurality of simulated rotating reels including a set of reel stops, wherein said set of reel stops includes a first subset of reel stops comprising visible reel symbols and a second subset of reel stops comprising blanks;

a remote host in communication with each of said plurality of processor-based gaming machines, said remote host being adapted to download the one or more visible reel symbols, virtual reel strips, or both to said plurality of processor-based gaming machines; and at least one simulated reel configurator in communication with at least one of said remote host and said plurality of processor-based gaming machines, wherein said simulated reel configurator is adapted to facilitate the display of simulated rotating reels through a viewing window of at least one of said display devices, and wherein said simulated reel configurator is adapted to configure at least one of said plurality of simulated rotating reels such that one or more visible reel symbols within said first subset of reel stops are stretched to change the size of the one or more visible reel symbols such that the one or more visible reel symbols are expanded into one or more blank regions of said second subset of reel stops adjacent thereto, thereby creating expanded reel symbols and reducing the amount of blank space occupied by the blank regions within said second subset of reel stops that may be seen by a player through said viewing window when movement of said at least are of said plurality of simulated rotating reels has stopped.

24. The wager-based gaming system of claim 23, wherein said at least one simulated reel configurator is located at said remote host.

25. The wager-based gaming system of claim 23, wherein said at least one simulated reel configurator is located within at least one of said plurality of processor-based gaming machines.

* * * * *